United States Patent
Suzuki et al.

(10) Patent No.: US 6,999,983 B2
(45) Date of Patent: Feb. 14, 2006

(54) METHOD AND APPARATUS FOR PRODUCING PSEUDORANDOM SIGNAL

(75) Inventors: Toshiya Suzuki, Kawasaki (JP); Naoto Yamashita, Kawasaki (JP); Muneyasu Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 10/233,795

(22) Filed: Sep. 3, 2002

(65) Prior Publication Data

US 2003/0023648 A1 Jan. 30, 2003

Related U.S. Application Data

(63) Continuation of application No. PCT/JP00/01427, filed on Mar. 9, 2000.

(51) Int. Cl.
*G06F 7/58* (2006.01)

(52) U.S. Cl. .................... 708/250; 708/422
(58) Field of Classification Search ........ 708/250–256, 708/422
See application file for complete search history.

(56) References Cited

U.S. PATENT DOCUMENTS

| | | | | |
|---|---|---|---|---|
| 4,355,366 | A * | 10/1982 | Porter | 708/255 |
| 6,026,117 | A * | 2/2000 | Ozluturk | 375/141 |
| 6,389,152 | B2 * | 5/2002 | Nakamura et al. | 382/100 |
| 6,549,862 | B1 * | 4/2003 | Huang et al. | 702/77 |
| 6,570,521 | B1 * | 5/2003 | Schofield | 341/144 |

FOREIGN PATENT DOCUMENTS

| | | |
|---|---|---|
| JP | 57-41028 | 3/1982 |
| JP | 63-2419 | 1/1988 |
| JP | 3-181238 | 8/1991 |
| JP | 4-5773 | 1/1992 |

* cited by examiner

*Primary Examiner*—Tan V. Mai
(74) *Attorney, Agent, or Firm*—Katten Muchin Rosenman LLP

(57) ABSTRACT

A pseudorandom signal generator uses two pseudorandom signals having a small correlation with each other to generate a cross-correlation function of the two pseudorandom signals, and to output a value of the cross-correlation function as a new pseudorandom signal. As the new pseudorandom signal as a result has random phases and random amplitudes, many new pseudorandom signals can be generated by the two existing pseudorandom signals.

7 Claims, 10 Drawing Sheets

FIG.4

| m | M SEQUENCE (2, 5) | M SEQUENCE (2, 3, 4, 5) | M SEQUENCE (1, 2, 4, 5) | M SEQUENCE (3, 5) | M SEQUENCE (1, 2, 3, 5) | M SEQUENCE (1, 3, 4, 5) |
|---|---|---|---|---|---|---|
| 1 | 1 | 1 | 1 | 1 | 1 | 1 |
| 2 | -1 | -1 | 1 | -1 | -1 | -1 |
| 3 | -1 | -1 | -1 | -1 | -1 | -1 |
| 4 | -1 | 1 | 1 | -1 | -1 | -1 |
| 5 | -1 | 1 | 1 | -1 | -1 | -1 |
| 6 | 1 | 1 | 1 | 1 | 1 | -1 |
| 7 | -1 | 1 | -1 | -1 | 1 | -1 |
| 8 | -1 | 1 | -1 | -1 | -1 | -1 |
| 9 | -1 | 1 | -1 | -1 | -1 | -1 |
| 10 | 1 | 1 | 1 | 1 | 1 | -1 |
| 11 | 1 | 1 | 1 | 1 | 1 | -1 |
| 12 | -1 | 1 | 1 | -1 | -1 | -1 |
| 13 | 1 | 1 | -1 | 1 | 1 | -1 |
| 14 | -1 | 1 | -1 | -1 | -1 | -1 |
| 15 | 1 | 1 | 1 | 1 | 1 | -1 |
| 16 | 1 | 1 | 1 | 1 | 1 | -1 |
| 17 | 1 | -1 | 1 | 1 | 1 | -1 |
| 18 | -1 | -1 | -1 | -1 | -1 | -1 |
| 19 | 1 | -1 | -1 | 1 | 1 | -1 |
| 20 | 1 | -1 | 1 | 1 | 1 | -1 |
| 21 | -1 | -1 | -1 | -1 | -1 | -1 |
| 22 | 1 | -1 | 1 | 1 | 1 | -1 |
| 23 | 1 | -1 | -1 | 1 | 1 | -1 |
| 24 | -1 | -1 | -1 | -1 | -1 | -1 |
| 25 | -1 | -1 | 1 | -1 | -1 | -1 |
| 26 | 1 | -1 | 1 | 1 | 1 | -1 |
| 27 | 1 | -1 | -1 | 1 | 1 | -1 |
| 28 | -1 | -1 | -1 | -1 | -1 | -1 |
| 29 | 1 | -1 | 1 | 1 | 1 | -1 |
| 30 | 1 | -1 | 1 | 1 | 1 | -1 |
| 31 | 1 | 1 | 1 | 1 | 1 | 1 |
| MIN | -1.0 | -1.0 | -1.0 | -1.0 | -1.0 | -1.0 |
| AVE | 0.0 | 0.0 | 0.0 | 0.0 | 0.0 | 0.0 |
| MAX | 1.0 | 1.0 | 1.0 | 1.0 | 1.0 | 1.0 |
| $\sigma$ | 1.017095255 | 1.0170095255 | 1.0170095255 | 1.0170095226 | 1.0170095255 | 1.0170095255 |

| | SIGNAL DATA A | SIGNAL DATA A | CROSS-CORRELATION FUNCTION |
|---|---|---|---|
| 1 | 1 | 1 | 1.000 |
| 2 | -1 | -1 | -0.032 |
| 3 | 1 | 1 | -0.032 |
| 4 | 1 | 1 | -0.032 |
| 5 | -1 | -1 | -0.032 |
| 6 | -1 | -1 | -0.032 |
| 7 | -1 | -1 | -0.032 |
| 8 | 1 | 1 | -0.032 |
| 9 | 1 | 1 | -0.032 |
| 10 | 1 | 1 | -0.032 |
| 11 | 1 | 1 | -0.032 |
| 12 | 1 | 1 | -0.032 |
| 13 | -1 | -1 | -0.032 |
| 14 | -1 | -1 | -0.032 |
| 15 | 1 | 1 | -0.032 |
| 16 | 1 | 1 | -0.032 |
| 17 | -1 | -1 | -0.032 |
| 18 | 1 | 1 | -0.032 |
| 19 | -1 | -1 | -0.032 |
| 20 | -1 | -1 | -0.032 |
| 21 | 1 | 1 | -0.032 |
| 22 | -1 | -1 | -0.032 |
| 23 | -1 | -1 | -0.032 |
| 24 | -1 | -1 | -0.032 |
| 25 | -1 | -1 | -0.032 |
| 26 | 1 | 1 | -0.032 |
| 27 | -1 | -1 | -0.032 |
| 28 | 1 | 1 | -0.032 |
| 29 | -1 | -1 | -0.032 |
| 30 | 1 | 1 | -0.032 |
| 31 | 1 | 1 | -0.032 |
| MIN | -1.0 | -1.0 | |
| AVE | 0.0 | 0.0 | |
| MAX | 1.0 | 1.0 | |
| $\sigma$ | 1.01709526 | 1.0170953 | |

FIG.8

|  | SIGNAL DATA A | SIGNAL DATA B | CROSS-CORRELATION FUNCTION |
|---|---|---|---|
| 1 | 1 | -1 | 0.226 |
| 2 | -1 | 1 | 0.226 |
| 3 | 1 | -1 | -0.032 |
| 4 | 1 | 1 | -0.032 |
| 5 | -1 | -1 | 0.226 |
| 6 | -1 | -1 | 0.226 |
| 7 | -1 | -1 | -0.290 |
| 8 | 1 | 1 | 0.226 |
| 9 | 1 | 1 | -0.290 |
| 10 | 1 | 1 | -0.032 |
| 11 | 1 | -1 | -0.032 |
| 12 | 1 | 1 | -0.032 |
| 13 | -1 | 1 | 0.226 |
| 14 | -1 | 1 | 0.226 |
| 15 | 1 | 1 | -0.032 |
| 16 | 1 | 1 | 0.226 |
| 17 | -1 | -1 | -0.290 |
| 18 | 1 | -1 | -0.290 |
| 19 | -1 | 1 | -0.032 |
| 20 | -1 | -1 | 0.226 |
| 21 | 1 | -1 | -0.032 |
| 22 | -1 | 1 | -0.290 |
| 23 | -1 | 1 | -0.032 |
| 24 | -1 | -1 | -0.032 |
| 25 | -1 | -1 | -0.032 |
| 26 | 1 | -1 | -0.032 |
| 27 | -1 | -1 | -0.290 |
| 28 | 1 | 1 | -0.032 |
| 29 | -1 | -1 | -0.032 |
| 30 | 1 | 1 | 0.226 |
| 31 | 1 | 1 | -0.032 |
| MIN | -1.0 | -1.0 |  |
| AVE | 0.0 | 0.0 |  |
| MAX | 1.0 | 1.0 |  |
| $\sigma$ | 1.01709526 | 1.0170953 |  |

FIG.9

| | SIGNAL DATA C | SIGNAL DATA C | CROSS-CORRELATION FUNCTION |
|---|---|---|---|
| 1 | 7.0 | 7.0 | 31.968 |
| 2 | 7.0 | 7.0 | -1.065 |
| 3 | -1.0 | -1.0 | -1.065 |
| 4 | -1.0 | -1.0 | -1.065 |
| 5 | 7.0 | 7.0 | -1.065 |
| 6 | 7.0 | 7.0 | -1.065 |
| 7 | -9.0 | -9.0 | -1.065 |
| 8 | 7.0 | 7.0 | -1.065 |
| 9 | -9.0 | -9.0 | -1.065 |
| 10 | -1.0 | -1.0 | -1.065 |
| 11 | -1.0 | -1.0 | -1.065 |
| 12 | -1.0 | -1.0 | -1.065 |
| 13 | 7.0 | 7.0 | -1.065 |
| 14 | 7.0 | 7.0 | -1.065 |
| 15 | -1.0 | -1.0 | -1.065 |
| 16 | 7.0 | 7.0 | -10.65 |
| 17 | -9.0 | -9.0 | -1.065 |
| 18 | -9.0 | -9.0 | -1.065 |
| 19 | -1.0 | -1.0 | -1.065 |
| 20 | 7.0 | 7.0 | -1.065 |
| 21 | -1.0 | -1.0 | -1.065 |
| 22 | -9.0 | -9.0 | -1.065 |
| 23 | -1.0 | -1.0 | -1.065 |
| 24 | -1.0 | -1.0 | -1.065 |
| 25 | -1.0 | -1.0 | -1.065 |
| 26 | -1.0 | -1.0 | -1.065 |
| 27 | -9.0 | -9.0 | -1.065 |
| 28 | -1.0 | -1.0 | -1.065 |
| 29 | -1.0 | -1.0 | -1.065 |
| 30 | 7.0 | 7.0 | -1.065 |
| 31 | -1.0 | -1.0 | -1.065 |
| MIN | -9.0 | -9.0 | |
| AVE | 0.1 | 0.1 | |
| MAX | 7.0 | 7.0 | |
| $\sigma$ | 5.84237399 | 5.842374 | |

FIG.10

| | SIGNAL DATA C | SIGNAL DATA D | CROSS-CORRELATION FUNCTION |
|---|---|---|---|
| 1 | 7.0 | 7.0 | -1.065 |
| 2 | 7.0 | 7.0 | 7.194 |
| 3 | -1.0 | 7.0 | 7.194 |
| 4 | -1.0 | -1.0 | -1.065 |
| 5 | 7.0 | -9.0 | -9.323 |
| 6 | 7.0 | -1.0 | -1.065 |
| 7 | -9.0 | 7.0 | -1.065 |
| 8 | 7.0 | -1.0 | -1.065 |
| 9 | -9.0 | -1.0 | -1.065 |
| 10 | -1.0 | -1.0 | 7.194 |
| 11 | -1.0 | -1.0 | -9.323 |
| 12 | -1.0 | -9.0 | -1.065 |
| 13 | 7.0 | -1.0 | -1.065 |
| 14 | 7.0 | -1.0 | -9.323 |
| 15 | -1.0 | -9.0 | -1.065 |
| 16 | 7.0 | -1.0 | -1.065 |
| 17 | -9.0 | 7.0 | -9.323 |
| 18 | -9.0 | -9.0 | 7.194 |
| 19 | -1.0 | -1.0 | 7.194 |
| 20 | 7.0 | -1.0 | 7.194 |
| 21 | -1.0 | 7.0 | 7.194 |
| 22 | -9.0 | 7.0 | -1.065 |
| 23 | -1.0 | 7.0 | 7.194 |
| 24 | -1.0 | -9.0 | -9.323 |
| 25 | -1.0 | 7.0 | 7.194 |
| 26 | -1.0 | -1.0 | -1.065 |
| 27 | -9.0 | -1.0 | -1.065 |
| 28 | -1.0 | -1.0 | -1.065 |
| 29 | -1.0 | -9.0 | 7.194 |
| 30 | 7.0 | 7.0 | -1.065 |
| 31 | -1.0 | -1.0 | -9.323 |
| MIN | -9.0 | -9.0 | |
| AVE | 0.1 | 0.1 | |
| MAX | 7.0 | 7.0 | |
| $\sigma$ | 5.84237399 | 5.842374 | |

METHOD AND APPARATUS FOR PRODUCING PSEUDORANDOM SIGNAL

This Application is a continuation of international application number PCT/JP00/01427 filed Mar. 9, 2000.

TECHNICAL FIELD

The present invention relates to a pseudorandom signal generating method and an apparatus therefor, and more particularly, to a pseudorandom signal generating method and an apparatus therefor which generate a pseudorandom signal that is used as a code as a key, or used as a diffusion signal of a CDMA method, and so forth.

BACKGROUND ART

Conventionally, a pseudorandom signal has been used as a code as a key, or used as a diffusion signal of a CDMA (Code Division Multiple Access) method. The following methods are conventional methods for creating a pseudorandom signal.

The first method is a method of creating and using various pseudorandom sequences (binary signal rows). Conventionally, there have been several types of pseudorandom sequences: an M-sequence (a maximum period sequence), a gold sequence, a barker sequence, and various sequences deriving from the M-sequence. Signal amplitudes thereof are binary (0 or 1), and phases are random. Level-converting these sequences (the binary signal rows) into appropriate values and using as signals makes pseudorandom signals.

These pseudorandom signals have different phases when generating polynomials as sources of generation differ, and thus become different signals. In addition, a cross correlation of different sequences exhibits a property different from a property of an autocorrelation of the sequence itself, and two signals can be distinguished, whether identical or different, by using this property. Additionally, since these pseudorandom signals are formed from generating polynomials, these pseudorandom signals become periodic signals though random. It is noted that these pseudorandom signals become signals random in one period. Due to these properties, these pseudorandom signals are suitable for diffusion signals used in the CDMA method.

The second method uses a noise in the natural world. In the natural world exists a signal, such as a thermal noise, which is likely to be usable as a random signal. Although this includes many types, each of these types is random, and thus is not reproducible. From these reasons, noises in the natural world are rarely used as diffusion signals used in the CDMA method. Besides, as a signal used for system identification, a signal having a normality and a spectral property within tolerable ranges is selected, and is used as the signal for system identification.

The pseudorandom signals generated by the conventional first method are limited in numbers. The number of the pseudorandom signals is theoretically determined according to types thereof. In the CDMA communication method, the number of the pseudorandom signals used as the diffusion signals equals the number of channels; therefore, the limitation on the number of the pseudorandom signals has caused a problem of limiting an increase in the number of the channels.

In addition, since commerce on the Internet began to attract attention, code as a key for the Internet commerce has attracted attention, and it has been required to further enhance security. For enhancing this security, it is important to increase complexity of the code itself, and at the same time, to increase the number of the codes. In general, a difficulty of code decryption is defined as a probability of finding out a code as a key, when using any temporal calculation method, i.e., a method of attempting to find the code as the key by using a computer. The smaller this probability is, the harder the code becomes to decrypt. That is because, when the number of the codes themselves is large, it takes a longer time to find out the code so that the decryption becomes difficult. However, since the pseudorandom signals generated by the conventional first method are limited in numbers, there has been a problem that there is a limit in enhancing the security of the code.

DISCLOSURE OF INVENTION

It is a general object of the present invention to provide a pseudorandom signal generating method and an apparatus therefor which can generate a new pseudorandom signal by using existing pseudorandom signals so as to increase the number of pseudorandom signals.

In order to achieve this object, the present invention is arranged to use two pseudorandom signals having a small correlation with each other, to generate a cross-correlation function of the above-mentioned two pseudorandom signals, and to output a value of the above-mentioned cross-correlation function as a new pseudorandom signal.

According to the pseudorandom signal generating method as above, a new pseudorandom signal is generated by generating a cross-correlation function of existing two pseudorandom signals; therefore, the new pseudorandom signal per se has random phases and random amplitudes; thus, when there are a plurality of existing pseudorandom signals, a multitude of new pseudorandom signals can be generated by selecting two of the existing pseudorandom signals.

BRIEF DESCRIPTION OF DRAWINGS

Other objects, features and advantages of the present invention will become more apparent from the following detailed description when read in conjunction with the accompanying drawings.

FIG. 4 is a diagram showing values of respective data, a minimum value, an average value, a maximum value and a standard deviation of M-sequential pseudorandom signals.

FIG. 5 is a diagram showing values of respective data, a minimum value, an average value, a maximum value and a standard deviation of new pseudorandom signals generated according to the present invention.

FIG. 7 is a diagram showing an auto-correlation function obtained from M-sequential pseudorandom signals.

FIG. 8 is a diagram showing a cross-correlation function obtained from M-sequential pseudorandom signals.

FIG. 9 is a diagram showing an auto-correlation function obtained from new pseudorandom signals generated by the method of the present invention.

FIG. 10 is a diagram showing a cross-correlation function obtained from new pseudorandom signals generated by the method of the present invention.

BEST MODE FOR CARRYING OUT THE INVENTION

Hereinbelow, a description will be given, with reference to the drawings, of embodiments according to the present invention.

In the present invention, by using two pseudorandom signals having a small correlation, or no correlation, with each other, a cross-correlation function of the two pseudorandom signals is calculated, and one pseudorandom signal is obtained from the cross-correlation function.

When the pseudorandom signals are discrete periodic signals, i.e., digital periodic signals, a new pseudorandom signal y [=y(1), . . . , y(m)] is generated from two pseudorandom signals a [=a(1), . . . , a(n)] and b [=b(1), . . . , b(n)], according to an expression (1). Besides, n and m are integers from 1 to N, where N is the number of data of the pseudorandom signal (that is, periodic, and the number of bits when the pseudorandom signal is a binary signal row). For example, N is 31.

$$y(m) = \frac{1}{N}\sum_{n=0}^{N} a(m) \Box b(n+m) \tag{1}$$

Basically, when the new pseudorandom signal y is generated by software, this expression (1) is used as it is. When the new pseudorandom signal y is generated by a digital circuit, an apparatus shown in FIG. 1 is used.

Figure 1:
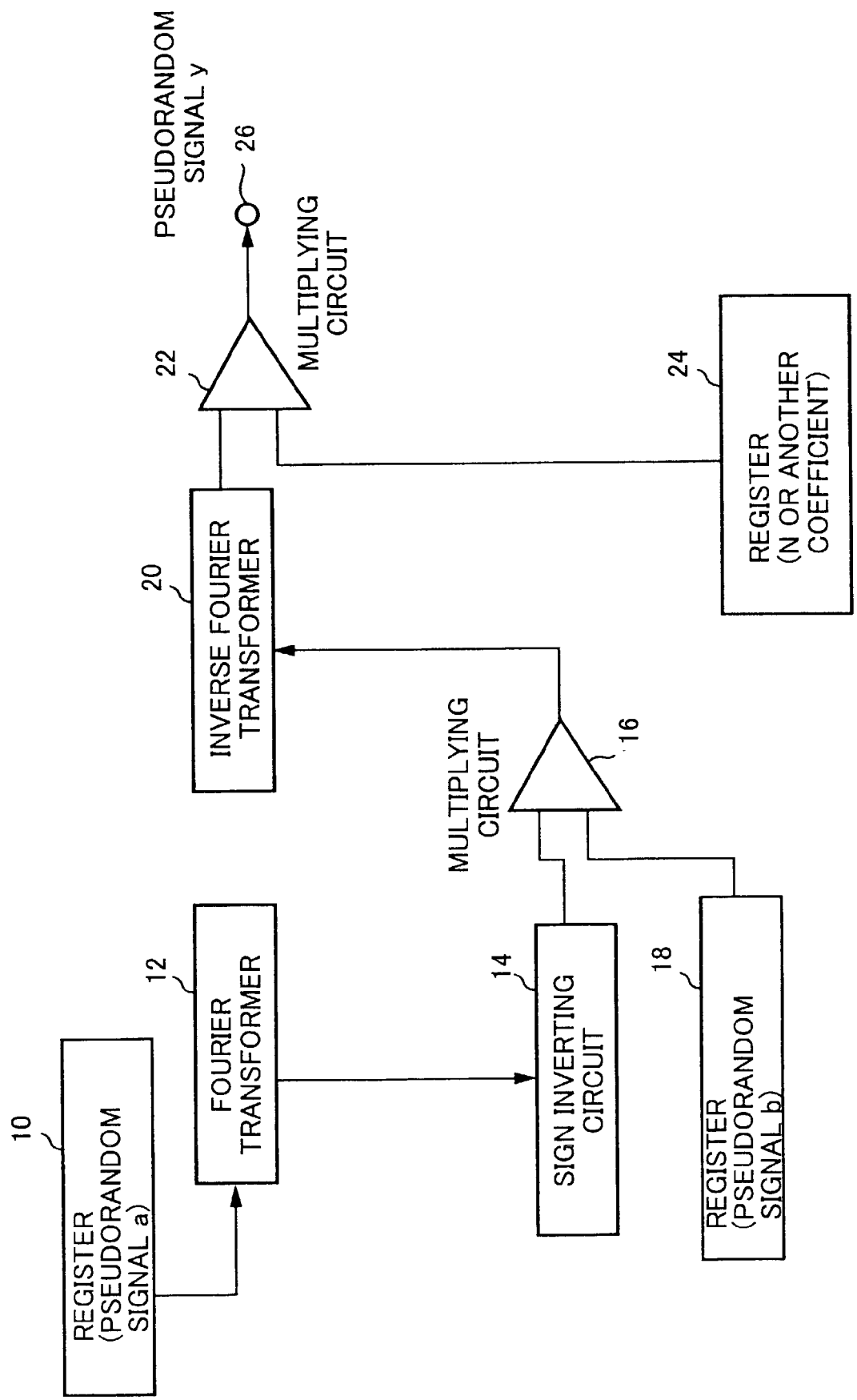
FIG. 1 is a block diagram of a first embodiment of the pseudorandom signal generation apparatus according to the present invention.

FIG. 1 shows a block diagram of a first embodiment of the pseudorandom signal generation apparatus according to the present invention. This embodiment performs a convolution calculation by a Fourier transform. In this figure, the pseudorandom signal a of N data, for example, is stored in a register 10; the pseudorandom signal a output from the register 10 in parallel is Fourier-transformed by a fast Fourier transformer (FFT) 12; and a Fourier transform value of a complex number obtained here has a sign of an imaginary part inverted by a sign inverting circuit 14, and is supplied to a multiplying circuit 16.

The pseudorandom signal b of N data is stored in a register 18; and the pseudorandom signal b output from the register 18 is supplied to the multiplying circuit 16, and is multiplied with the Fourier transform value of the complex number having the sign of the imaginary part inverted. A value of a complex number obtained thereby is supplied to an inverse Fourier transformer 20. The inverse Fourier transformer 20 performs an inverse Fourier transform of the above-mentioned value of the complex number so as to generate and output the new pseudorandom signal y represented by the expression (1). In a multiplying circuit 22, this new pseudorandom signal y is multiplied by the number N of data supplied from a register 24, and is output from a terminal 26.

Besides, since each data of the new pseudorandom signal y [=y(1), . . . , y(m)] represented by the expression (1) is a value of the cross-correlation function per se, i.e., a real value, the new pseudorandom signal y is multiplied by the number N of data in the multiplying circuit 22, and thereafter is output, so as to turn this into an integral value that is convenient to use. Additionally, when using the new pseudorandom signal y as a real number, the new pseudorandom signal y is multiplied by a purposeful coefficient in place of N.

Figure 2:
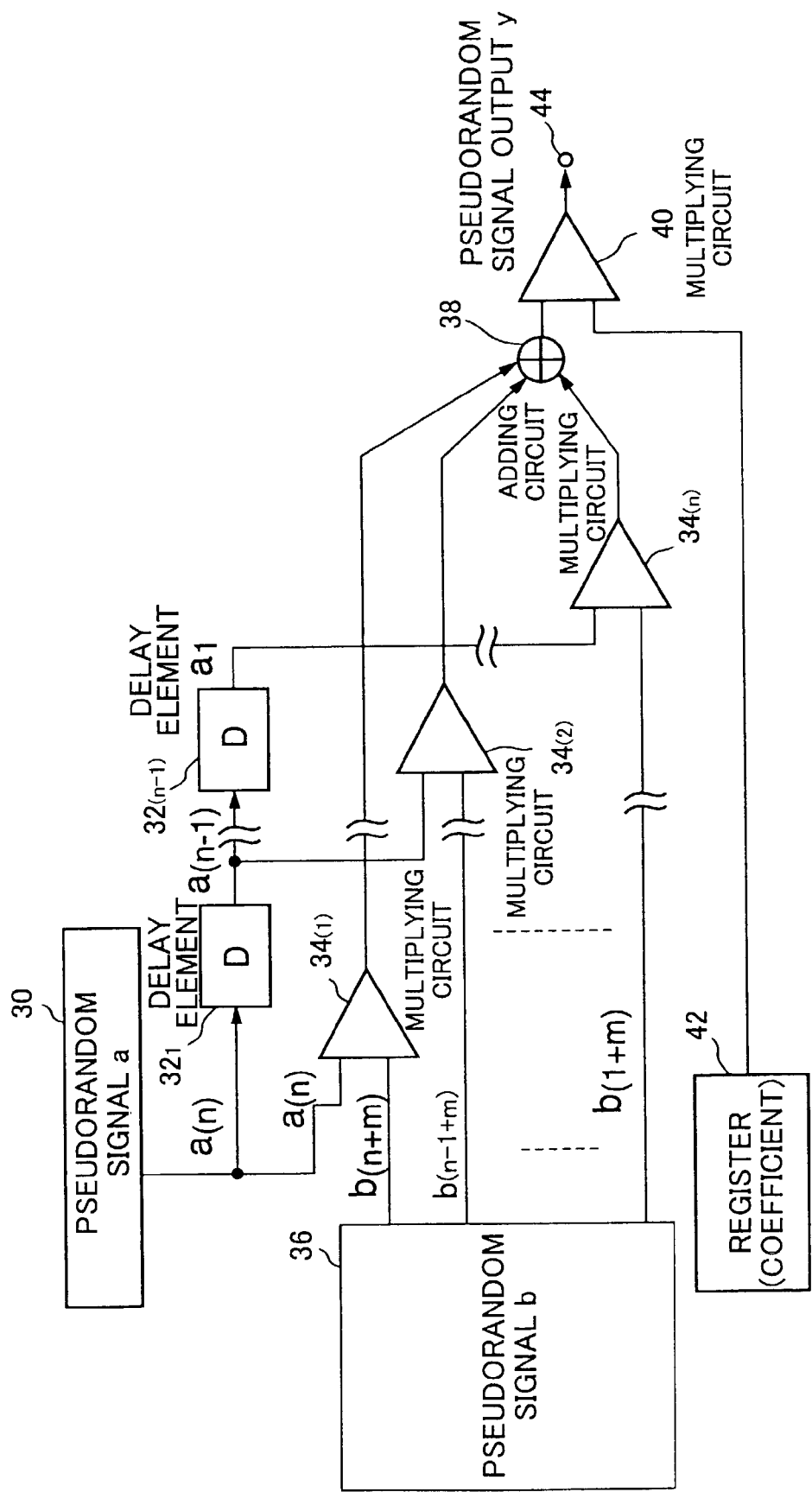
FIG. 2 is a block diagram of a second embodiment of the pseudorandom signal generation apparatus according to the present invention.

FIG. 2 shows a block diagram of a second embodiment of the pseudorandom signal generation apparatus according to the present invention. This embodiment calculates the expression (1) as it is. In this figure, the pseudorandom signal a of N data, for example, is stored in a register 30; and data a(1), a(2), . . . , a(n) of the pseudorandom signal a are read out one by one from the register 30 at each unit time, are supplied to a delay element 32(1), and are delayed by cascaded delay elements 32(1), 32(2), . . . , 32(n−1). Each of the delay elements 32(1) to 32(n−1) performs a delay by the unit time. The data read out from the register 30 and respective output data of the delay elements 32(1) to 32(n−1) are supplied to multiplying circuits 34(1) to 34(n).

The pseudorandom signal b of N data, for example, is stored in a shift register 36; and data b(1+m) to b(n+m) of the pseudorandom signal b read out simultaneously from the shift register 36 are supplied to the multiplying circuits 34(n) to 34(1), and are multiplied with the data a(1) to a(n) of the pseudorandom signal a, respectively, at the time at which the data a(n) is read out from the register 30. Respective outputs of the multiplying circuits 34(n) to 34(1) are added by an adding circuit 38 so that the data y(m) of the new pseudorandom signal y is obtained. In a multiplying circuit 40, this data y(m) is multiplied by a purposeful coefficient supplied from a register 42, and is output from a terminal 26.

In this apparatus, a position for outputting the pseudorandom signal b of N data is shifted one by one by the shift register 36 so that m is changed from 1 to N successively so as to calculate the data y(m) one by one. Therefore, in comparison with the embodiment shown in FIG. 1, a counting frequency and a counting time become larger; however, since this apparatus is composed of the registers, the delay elements, the multiplying circuits, and the adding circuit, a circuit configuration becomes simpler. Accordingly, the circuit shown in FIG. 2 and the circuit shown in FIG. 1 may be used case by case such that the circuit shown in FIG. 2 is used when the number N of data of the pseudorandom signal is small, and the circuit shown in FIG. 1 is used when the number N of data of the pseudorandom signal is large.

In the present invention, by using two pseudorandom signals having a small correlation with each other, a cross-correlation function of the two pseudorandom signals is calculated, and one pseudorandom signal is obtained from the cross-correlation function. Therefore, a number B of new pseudorandom signals that can be generated by selecting two pseudorandom signals from a number A of pseudorandom signals is represented by an expression (2).

$$B=A!/[2(A-2)!] \tag{2}$$

Figure 3:
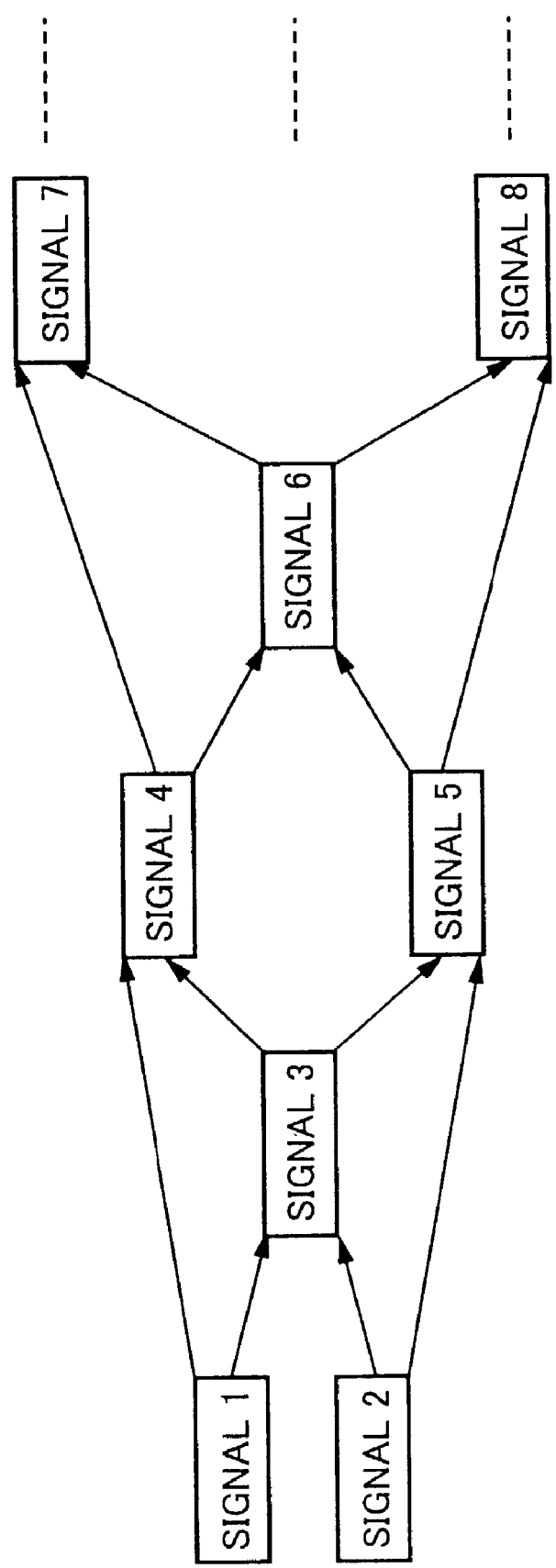
FIG. 3 is a diagram showing how a pseudorandom signal generating method of the present invention is.

For example, when A is 100, B becomes 4950. Further, the cross-correlation function of the new pseudorandom signal generated by the expression (1) and the source pseudorandom signals, or a cross-correlation function of new pseudorandom signals each other can be used as a pseudorandom signal. FIG. 3 shows how a pseudorandom signal generating method of the present invention is.

In FIG. 3, first, pseudorandom signals 1 and 2 are prepared, and a new pseudorandom signal 3 is formed by using those signals. In the same manner, a pseudorandom signal 4 can be formed from the pseudorandom signal 1 and the pseudorandom signal 3, and a pseudorandom signal 5 can be formed from the pseudorandom signal 2 and the pseudorandom signal 3. By repeating this method, a multitude of pseudorandom signals, such as pseudorandom signals 6, 7, 8 and so forth, can be formed. Since these new pseudorandom signals per se are signals having random phases and amplitudes, there is very little risk that a plurality of identical pseudorandom signals may be formed. Accordingly, assuming that there are initially the number A of pseudorandom signals, the number B of pseudorandom signals can be formed by selecting any two therefrom. Further, a still larger number of pseudorandom signals can be formed by using the number B of those pseudorandom signals and the number A of the source pseudorandom signals, and the number is limitless.

FIG. 4 shows six M-sequential pseudorandom signals (2, 5), (2, 3, 4, 5), (1, 2, 4, 5), (3, 5), (1, 2, 3, 5) and (1, 3, 4, 5) each having the number of data being 31. FIG. 4 shows a minimum value, an average value, a maximum value and a standard deviation besides values of respective data. These M-sequential pseudorandom signals are binary sequences with each data being binary.

Figure 5:
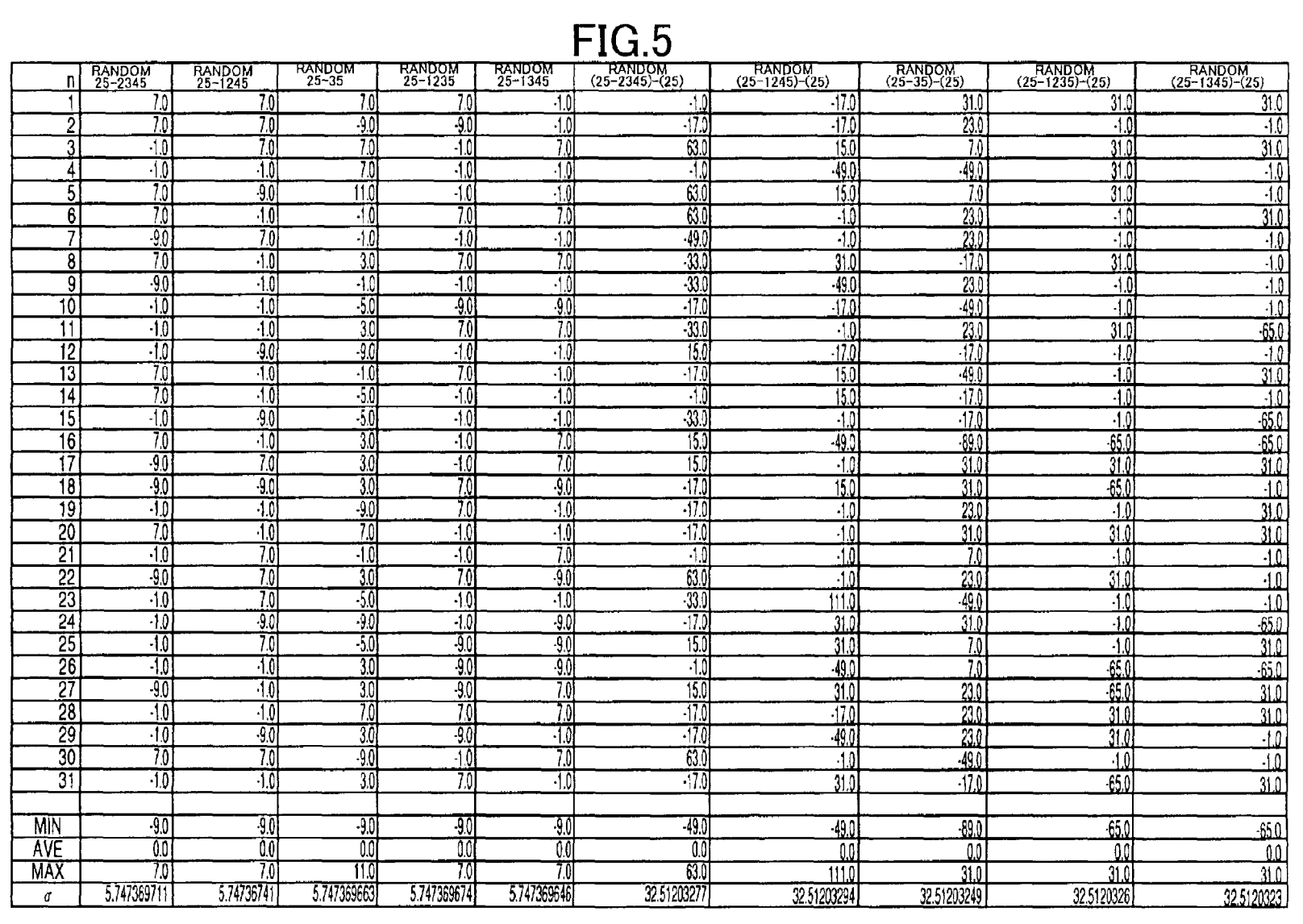

FIG. 5 shows new pseudorandom signals generated from the above-mentioned M-sequential pseudorandom signals. From the leftmost column are shown a new pseudorandom signal (25-2345) generated from the M-sequential pseudorandom signals (2, 5) and (2, 3, 4, 5), a new pseudorandom signal (25-1245) generated from the M-sequential pseudorandom signals (2, 5) and (1, 2, 4, 5), a new pseudorandom signal (25-35) generated from the M-sequential pseudorandom signals (2, 5) and (3, 5), a new pseudorandom signal (25-1235) generated from the M-sequential pseudorandom signals (2, 5) and (1, 2, 3, 5), and a new pseudorandom signal (25-1345) generated from the M-sequential pseudorandom signals (2, 5) and (1, 3, 4, 5).

Further shown are a new pseudorandom signal (25-2345)-(25) generated from the pseudorandom signals (25-2345) and (2, 5), a new pseudorandom signal (25-1245)-(25) generated from the pseudorandom signals (25-1245) and (2, 5), a new pseudorandom signal (25-35)-(25) generated from the pseudorandom signals (25-35) and (2, 5), a new pseudorandom signal (25-1235)-(25) generated from the pseudorandom signals (25-1235) and (2, 5), and a new pseudorandom signal (25-1345)-(25) generated from the pseudorandom signals (25-1345) and (2, 5). As in FIG. 4, FIG. 5 shows a minimum value, an average value, a maximum value and a standard deviation besides values of respective data. These new pseudorandom signals are multivalued sequences with each data being multivalued.

Figure 6A:
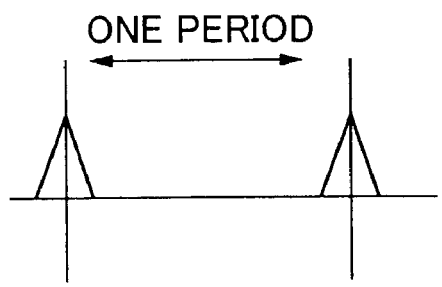
FIG. 6(A) is a diagram showing an auto-correlation function of identical random signals.
Figure 6B:
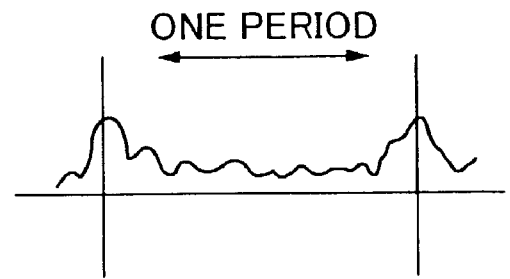
FIG. 6(B) is a diagram showing an auto-correlation function of different random signals.

The pseudorandom signals generated in the present embodiment and other pseudorandom signals (e.g., the M-sequential pseudorandom signals) can be distinguished by calculating an auto-correlation function of both of these. Specifically, if both of these are identical random signals, the auto-correlation function becomes a high value at the start of one period as does a delta function, and becomes a considerably small value at other positions, as shown in FIG. 6(A). On the other hand, if both of these are different pseudorandom signals, an auto-correlation function becoming any value throughout one period is obtained, as shown in FIG. 6(B).

FIG. 7 shows a cross-correlation function obtained from the M-sequential pseudorandom signal (2, 5) and the M-sequential pseudorandom signal (2, 5) shown in FIG. 4, i.e., an auto-correlation function thereof. FIG. 8 shows a cross-correlation function obtained from the M-sequential pseudorandom signal (2, 5) and the M-sequential pseudorandom signal (2, 3, 4, 5) shown in FIG. 4. FIG. 9 shows a cross-correlation function obtained from the new pseudorandom signal (25-2345) shown in FIG. 5 generated by the method of the present invention and the new pseudorandom signal (25-2345) generated by the method of the present invention, i.e., an auto-correlation function thereof. FIG. 10 shows a cross-correlation function obtained from the new pseudorandom signal (25-2345) shown in FIG. 5 generated by the method of the present invention and the new pseudorandom signal (25-1245) generated by the method of the present invention.

Additionally, in a CDMA communication method, using the pseudorandom signal generated according to the present invention as a diffusion signal can further increase the number of channels of the CDMA communication. Since any combination of the pseudorandom signals is possible, a larger number of diffusion signals can be formed than by using a current method. In addition, since a still larger number of diffusion signals can be formed by repeating this manner, it can be expected that the channels increase largely. In principle, the number of the channels is limitless.

The pseudorandom signal generated according to the present invention can be used as a code as a key necessary for electronic commerce on the Internet. As a code as a key for electronic commerce, the following properties are required: firstly, easy to create for those who use the code; and secondly, difficult to decode for enemies who attempt to decode the code. This relationship is referred to as unidirectional function. The pseudorandom signal generated according to the present invention is random itself, and can be increased in considerably large numbers. That is, the enemies have to find a signal suiting the code as the key from among a multitude of signals, and because of the random property, decoding becomes remarkably difficult. For those who create this code, it easy to create this code.

Further, the pseudorandom signal generated according to the present invention can be used as an impulse signal for system identification. Used as a general system identifying method is a method of inputting an impulse signal into a system, and requesting an impulse response. However, since there is a problem, such as that the impulse signal is difficult to create, a pseudorandom signal having properties similar to characteristics of a white noise is normally used. For this pseudorandom signal, a normality (to have a normal distribution as a random variable) is required so as to be used easily in statistics. The conventional M-sequential pseudorandom signal and so forth have the normality when passed through a low-pass filter, and become signals deviating from the normality when a cutoff frequency of the low-pass filter comes out of a predetermined range differing according to types of the pseudorandom signal. Therefore, it has been difficult to use the conventional M-sequential pseudorandom signal and so forth as the impulse signal. However, the pseudorandom signal generated according to the present invention, whose frequency spectrum is flat up to a maximum frequency of the signal itself, has the normality over a wide frequency band, and has properties similar to a white noise. Thus, since the pseudorandom signal generated according to the present invention has the properties similar to a white noise, the pseudorandom signal generated according to the present invention does not have to be passed through a low-pass filter, and can be used for the above-mentioned system identification.

The invention claimed is:

1. A pseudorandom signal generating apparatus using two pseudorandom signals to generate a cross-correlation function of said two pseudorandom signals, and outputting a value of said cross-correlation function as a new pseudorandom signal, the apparatus comprising:
    a Fourier transformer performing a Fourier transform of a first pseudorandom signal;
    a sign inverting circuit inverting a sign of an imaginary part of an output value of said Fourier transformer;
    a first multiplying circuit performing, in a frequency domain, a multiplication of an output value of said sign inverting circuit and a second pseudorandom signal; and
    an inverse Fourier transformer performing an inverse Fourier transform of an output value of said first multiplying circuit so as to output as said new pseudorandom signal.

2. The pseudorandom signal generating apparatus as claimed in claim 1, comprising:
    a second multiplying circuit multiplying an output value of said inverse Fourier transformer by a predetermined coefficient.

3. A pseudorandom signal generating apparatus using two pseudorandom signals to generate a cross-correlation function of said two pseudorandom signals, and outputting a value of said cross-correlation function as a new pseudorandom signal, the apparatus comprising:
    a plurality of multiplying circuits performing multiplications of respective data composing a first pseudorandom signal and respective data composing a second pseudorandom signal;
    an adder adding respective output values of said multiplying circuits so as to output as data composing said new pseudorandom signal; and
    a shift register shifting the respective data composing the second pseudorandom signal and supplying the respective data composing the second pseudorandom signal to said multiplying circuits so as to obtain respective data composing said new pseudorandom signal.

4. The pseudorandom signal generating apparatus as claimed in claim 3, comprising:
    a multiplying circuit multiplying an output value of said adder by a predetermined coefficient.

5. A pseudorandom signal generating apparatus using two pseudorandom signals to generate a cross-correlation function of said two pseudorandom signals, and outputting a value of said cross-correlation function as a new pseudorandom signal,
    wherein said new pseudorandom signal is used as a diffusion signal of a CDMA method.

6. A pseudorandom signal generating apparatus using two pseudorandom signals to generate a cross-correlation function of said two pseudorandom signals, and outputting a value of said cross-correlation function as a new pseudorandom signal,
    wherein said new pseudorandom signal is used as a code as a key.

7. A pseudorandom signal generating apparatus using two pseudorandom signals to generate a cross-correlation function of said two pseudorandom signals, and outputting a value of said cross-correlation function as a new pseudorandom signal,
    wherein said new pseudorandom signal is used as an impulse signal for system identification.

* * * * *